United States Patent [19]

Graat

[11] 4,071,322
[45] Jan. 31, 1978

[54] APPARATUS FOR PRODUCING AN INERT GAS

[75] Inventor: Johannes W. Graat, Overasselt, Netherlands

[73] Assignee: Smit Nijmegen B.V., Nymegen, Netherlands

[21] Appl. No.: 682,546

[22] Filed: May 3, 1976

Related U.S. Application Data

[63] Continuation of Ser. No. 487,424, July 10, 1974, abandoned.

[30] Foreign Application Priority Data

May 16, 1974 Germany .............................. 2424064
May 16, 1974 Germany ........................ 7417281[U]

[51] Int. Cl.² .......................... B01J 1/00; B01J 7/00; F23D 11/00
[52] U.S. Cl. .................................. 23/262; 23/277 R; 23/281; 23/284; 252/372; 261/17; 261/DIG. 9; 431/4; 431/160; 431/353
[58] Field of Search ...................... 23/262, 281, 259.5, 23/277 R; 261/17, DIG. 9; 431/160, 4, 353

[56] References Cited

U.S. PATENT DOCUMENTS

| 2,296,434 | 9/1942 | Ghelardi et al. ................. 252/372 X |
| 2,564,700 | 8/1951 | Krejci .............................. 23/259.5 X |
| 2,599,981 | 6/1952 | Ekholm ........................... 23/259.5 X |
| 2,714,552 | 8/1955 | Martin ................................... 23/281 |
| 2,781,251 | 2/1957 | Howell .............................. 23/262 X |
| 3,208,830 | 9/1965 | Knight et al. ........................ 23/281 |
| 3,376,111 | 4/1968 | Stegelman ...................... 23/259.5 X |
| 3,522,000 | 7/1970 | Kinney ............................... 23/284 X |
| 3,554,706 | 1/1971 | Henderson .......................... 23/259.5 |
| 3,904,376 | 9/1975 | Kawata ............................... 23/262 X |
| 3,947,217 | 3/1976 | Graat et al. ......................... 23/281 X |

FOREIGN PATENT DOCUMENTS

| 2,246,742 | 5/1974 | Germany. |
| 473,697 | 10/1937 | United Kingdom ................. 252/372 |

*Primary Examiner*—Joseph Scovronek
*Attorney, Agent, or Firm*—Burgess, Dinklage & Sprung

[57] ABSTRACT

Apparatus for the production of an inert gas wherein liquid of gaseous hydrocarbons are burnt within a combustion chamber with air, possibly with the admixture of a gaseous atomizing agent, especially steam, inert gas or air, whereby a first shock-like cooling is performed, which is followed by a second cooling step and a scrubbing with water or an aqueous solution of a temperature in the vicinity of the freezing point, and the gas treatment is finished with an adsorption drying.

8 Claims, 3 Drawing Figures

Fig. 1

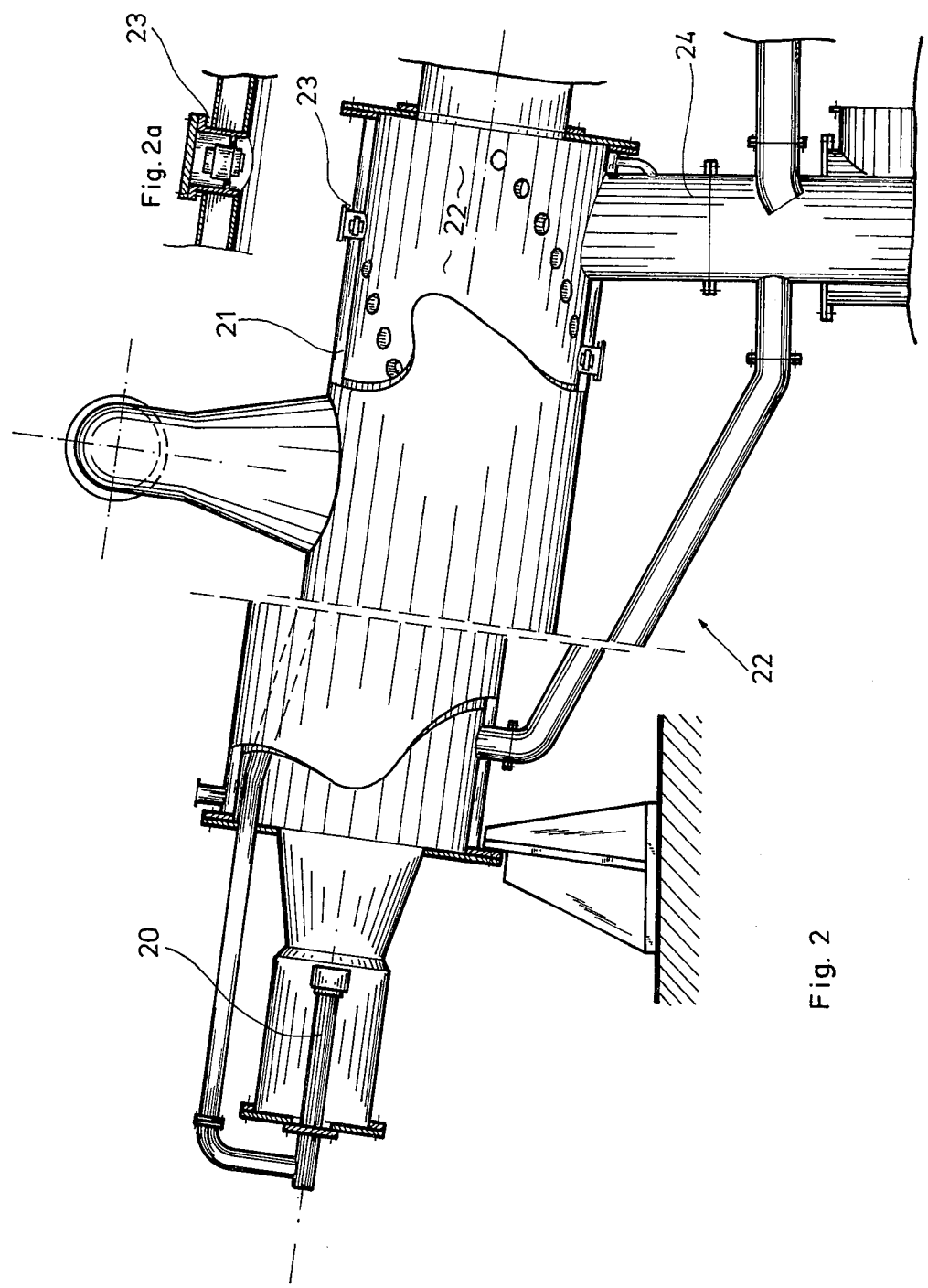

APPARATUS FOR PRODUCING AN INERT GAS

This is a continuation of application Ser. No. 487,424 filed July 10, 1974, now abandoned.

The present invention relates to an apparatus for the production of an inert gas wherein liquid or gaseous hydrocarbons are burnt within a combustion chamber with combustion air, possibly with the admixture of a gaseous atomizing agent, especially steam, inert gas or air.

The inert gas produced in accordance with the process of the invention is used primarily in tank ships and in the transportation field for neutralizing empty tanks and for providing an inert atmosphere within filled tanks. However, such inert gas may be used also for fire extinguishing purposes and as a protective gas in the transportation of perishable goods, such as e. g. fish meal, and in refrigerating houses and the like.

It is known to produce inert gas by means of a burner within combustion chambers having ceramic linings, whereby the gas is subsequently cooled in spray coolers wherein part of the water is already condensed, and finally dried in a drier plant. However, it is of disadvantage in these known methods that the apparatus employed are relatively expensive, that a great amount of energy must be wasted for the cooling, and that the control is slow or sluggish such that in most cases a quick shut-down is impossible when the combustion chamber is damaged.

Further, in the known method it has been found to be disadvantageous that maintaining of the desired composition of the inert gas is too expensive and that the systems are susceptible to trouble while repairs, particularly of the combustion chamber, can be made with difficulty only. Besides, the inert gas produced in such systems must be dried in an expensive manner.

In contrast herewith, it is the object of the present invention to provide a process and an apparatus for carrying out such process, which in general do no longer suffer from the abovementioned disadvantages and from the disadvantages of the prior art.

In particular, the process according to the present invention should be controllable in an easy manner and with minimum sluggishness, whereby it should require low amounts of energy for the drying and permit the production of an inert gas having the desired composition even from combustion oils of high sulfur content, and such process should lend itself to be performed easily and economically and, in particular, allow an apparatus to be used which may be manufactured economically and which may be of small size, too. Further, the system should include a simple inert gas drying apparatus adapted to be rapidly regenerated. Furthermore, the cooling process of the inert gas should be simplified and adapted to be carried out even with conventional coolers which are frequently present on board of ships. Such coolers mostly involve so-called Freon coolers wherein the water is cooled indirectly.

Accordingly, the apparatus according to the invention should be of small size, of compact construction and fail-safe, and is should be suitable particularly for the combination of a self-contained unit such that economical manufacture thereof is rendered possible.

According to another object of the invention, the combustion chamber employed should be adapted to be readily started up and shut down, and the combustion chamber should not suffer any damage even in the case of trouble in the cooling water supply, and it should be adapted to be installed in any desired position. These objects are solved in that there is performed immediately after the combustion, a first shock-like cooling, particularly a spray cooling, which is followed by a second cooling step and a scrubbing with water or an aqueous solution at a temperature in the vicinity of the freezing point, and the gas treatment is finished with an adsorption drying.

In the following an exemplary embodiment of the invention is explained in greater detail by referring to the accompanying drawings, wherein:

FIG. 2 shows a combustion chamber.

FIG. 2a shows a spray nozzle.

Figure 1:
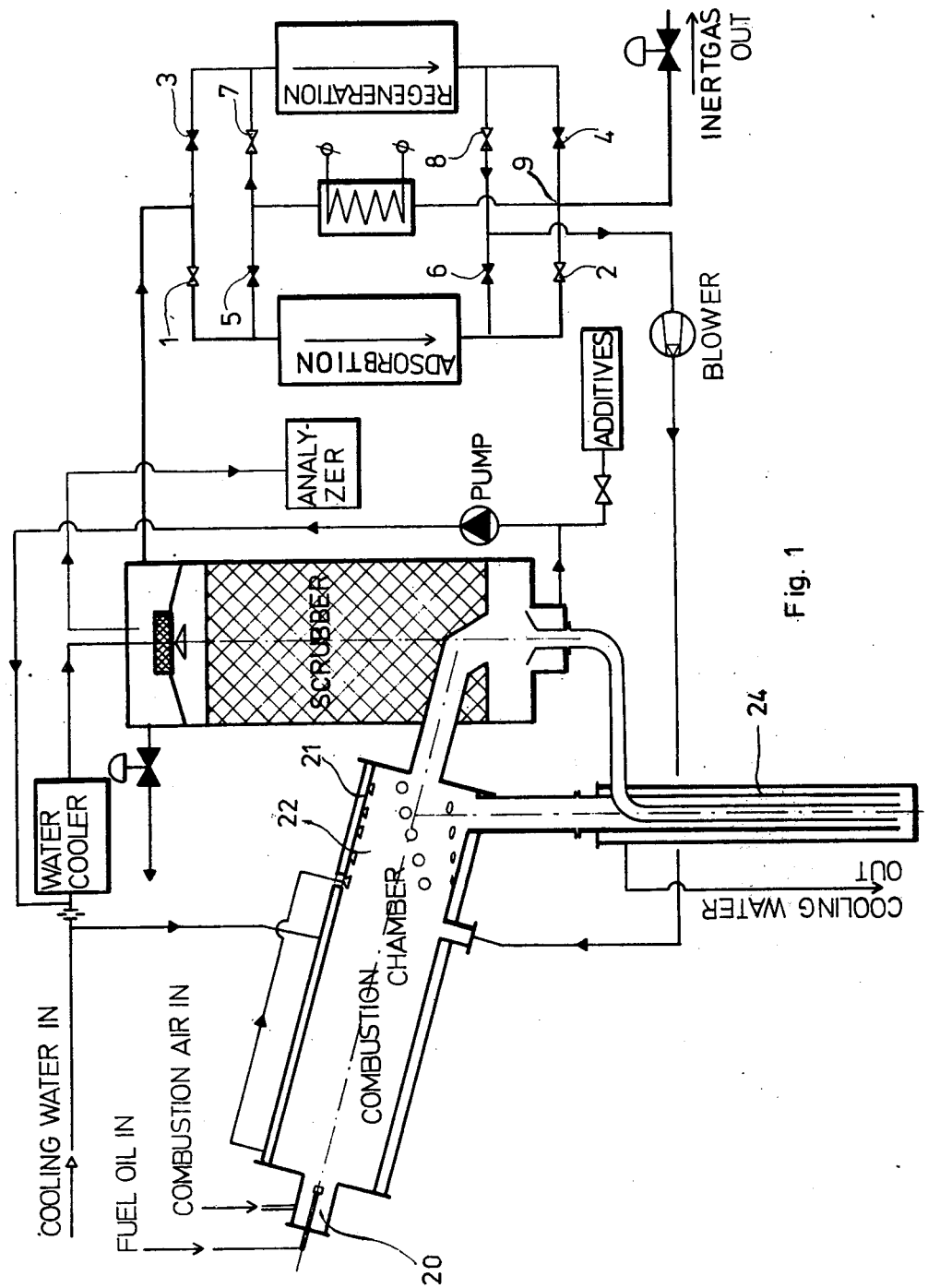
FIG. 1 shows a diagram of the apparatus according to the invention.

For carrying out the process according to the invention, there are employed in the apparatus according to the invention a burner and a controlling method which are explained in greater detail for instance in the German patent applications Nos. 2,320,442 and 2,246,742 laid open to public inspection. In these regards, explicit reference is made to the disclosures of these publications. As indicated in the left hand portion of FIG. 1 and in FIG. 2, fuel oil is burnt e. g. in a dual-stage burner, whereby air, gas, inert gas or steam serves as the atomizing medium and the combustion air is supplied — in a manner known per se — in parallel through the burner 20. In a manner that is surprising to the expert, the process of the invention, in addition to the combustion of gas, natural gas and fuel oil of low sulfur content, is also suitable for the combustion of fuel or diesel oil having a high sulfur content of up to 4%. The generated flame and the hot combustion gases enter the actual combustion chamber 22 which is provided with a cooling jacket 21 and formed with cylindrical configuration, in which combustion chamber an inert gas having a very slight content of nitric oxides is produced. Further, the inert gas produced in this way has a very low CO content even at minor oxygen concentrations of e. g. 1000 ppm. The soot formation is completely eliminated.

Cooling water flows through the jacket of the combustion chamber, which cooling water may be derived e. g. from the sea or from another suitable cooling water reservoir.

The rear portion of the combustion chamber in the flow direction of the gas is provided on the inner cylinder thereof with spray nozzles 23 through which nozzles the cooling water enters the interior of the combustion chamber from the cooling jacket so as to cool the inert gas in a first stage immediately after the production of such gas. It can be postulated that the inert gas will reach a temperature which corresponds approximately to the temperature of the cooling water. Thus, when using cooling water at a temperature of about 20° C, the gas temperature would adjust itself to about 20° C. The cooling water is withdrawn in downward direction and discharged through a known per se gas-tight drain.

The inert gas flows both directly from the combustion chamber and from the gas separator for the cooling water into a scrubber (scrubbing and spray cooling unit) wherein the gas flows upwards to be withdrawn at the top. In known manner, the scrubber is packed with Raschig's rings or other suitable packing bodies. On the other hand, the cooling water enters from above, and this water is distributed across the cross-sectional area of the scrubber by means of a suitable nozzle thereby to flow in opposition to the gas in a counter-current. Upon accumulation of the cooling water in the sump of the scrubber, this water, through a pump, is pumped into a commercially available cooler, e. g. a Freon cooler, wherefrom it flows back into the scrubber (Note: Freon = $CF_2Cl_2$). Accordingly, the cooling of the inert gas is effected indirectly by passing the cooling water into a cooler. Thereafter, the cooling water is directly contacted with the inert gas.

The cooler is constructed so as to have extremely small dimensions even if it is to provide a high efficiency. In addition to its function of cooling the cooling water, the cooler may assume further functions, for example the operation of an air conditioning system or the production of cooled drinking water.

Alternatively, for the cooling of the circulating water, there may be used a cooler which has already been utilized for other purposes.

Due to the low water temperature within the scrubber, the solubility of the harmful gases is substantially increased. Inert gas is continuously or discontinuously removed from the scrubber head or top for analysis, whereby the fuel-combustion air ratios within the combustion chamber are adjusted on the basis of such analysis.

As the water for the scrubber is pumped in a closed loop or circuit, the system can be operated with additives supplied by means of an additional metering device, e. g. a pump. The additives form compounds with the undesired components contained in the gas. If the water is circulated through a circuit, these additives are not removed again as in the case of cooling water which simply flows through the system. The temperature of the circulated cooling water is in the vicinity of the freezing point, e.g. at about 1° to 4° C; the inert gas is discharged from the scrubber at approximately the same temperature as the circulated cooling water. Hereby, it shows to be "economizing to the system" that the only slightly heated cooling water is used again for the cooling process, and that at the low temperature level which is required for further cooling, an otherwise necessary cooling of the cooling water passing through the system can be avoided.

The combustion chamber (FIG. 2) has a cylindrical configuration and a small diameter only. Compared with the prior art, this combustion chamber is much more compact. Besides, the configuration of the combustion chamber permits one to produce inert gas of high pressure. The combustion chamber may be formed from steel or from stainless steel on the whole, such that it can be rendered tight even at elevated pressures. When using inert gas of relatively high pressure, the subsequent components, such as the above-described scrubber and the subsequent drying system, can be designed with a very small volume such that, on the whole, there is provided an extremely compact system with a minimum of economical expenditure.

From the scrubber, the inert gas flows to a pair of drier adsorbers which, as known, are packed with an adsorbing, hydrophilic material, such as silicagel or aluminagel or another suitable material, such that the dew point can be shifted, for example, from plus 30° C to a range of from minus 20° to minus 70° C. In dependency of the requisite dew point — which forms a measure of the water contents — the respectively suitable drying agent is employed. In the present case, the dew point of the mixture is so low that raising of the gas temperature results in a substantially complete drying for the contemplated purpose.

In operation, either of the adsorbers is alternatingly active, while the other adsorber is continuously or discontinuously regenerated during the period of operation of the other adsorber. As shown in FIG. 1, the inert gas first flows via the open valve 1 through the adsorber shown at the left hand side of the Figure, and via the valve 2 to the utilizing or consumer connection. A partial flow of the dried gas is removed at 9 and heated in a heater. Then, this gas flows via the open valve 7 through the second adsorber which is just connected for regeneration, and via another open valve 8 back to the combustion chamber while being slightly compressed by means of a blower. Advantageously, the connecting line opens into a portion of the combustion chamber where the combustion has already reached an end and after which the first scrubbing step is performed.

The fan is required to have a low capacity only because it must merely compensate for the flow losses of the inert gas in the scrubber and in the series-connected adsorbers for the branched flow.

Upon removal of the water by the heated inert gas, the heater is switched off, and cool inert gas is passed through the adsorber to be regenerated. Hereby, the adsorbing composition is cooled down to the operation temperature again.

After the first adsorber is loaded and the second adsorber is regenerated, the valves are shifted. Valves 1 and 2 as well as valves 7 and 8 are closed, while valves 3 and 4 as well as valves 5 and 6 are opened. Then, the inert gas stream flows via the valve 3 into the adsorber shown at the right hand side in the Figure, and then via the valve 4 to the consuming device. At the position 9, a partial stream is branched off again and heated within the heater. Thereafter, this stream flows via the presently open valve 5 through the adsorber shown at the left hand side in the Figure, wherefrom the partial stream is then returned to the blower via the valve 6.

As the regeneration is effected by already dried inert gas, such regeneration can be carried out in a shorter period of time than in the conventional adsorbers which are dried by means of heated atmospheric air. The latter will always contain a substantial residual amount of water, especially in tropical regions. With suitable selection of the branched off gas stream and with an increase of temperature, the system may be transferred from the one adsorber to the other in shorter intervals, so that the size of these adsorbers can be greatly reduced, too. Also, the regeneration by means of inert gas is more economical than the regeneration by atmospheric air because the latter must be heated to a very high temperature prior to use which results in increased stresses to the material. Further, since the inert gas used for the regeneration may be fed back, gas losses can be avoided.

In the second stage, the cooling of the inert gas produced involves temperatures in the vicinity of the freezing point; accordingly, the rate of removal of $SO_2$ is very high already at this point.

As experience has shown, the above-described apparatus can be operated at lower temperatures than the conventional inert gas generators. On the other hand, it is also possible to operate it at a higher gas pressure. Accordingly, the present process is superior to the known processes. Furthermore, the process according to the invention permits fuel oils of high sulfur content to be used. Additionally, the scrubbing capacity of the scrubber may be greatly improved by the addition of additives which strongly increase the absorbing capacity of the scrubbing water. For example, diluted lye or leaching solutions can be added which convert the $SO_2$ of the fuel gas into soluble compounds.

As should be apparent to the expert, the present system, because of the small volume of gas present therein, can be controlled, started and shut down in a particularly easy manner. In this way, the subject matter of the invention provides an ideal solution of the present problems.

What I claim is:

1. In an apparatus for producing an inert gas of the type wherein liquid or gaseous hydrocarbons are burnt with air, comprising:

an elongated chamber having a combustion portion including one end of the chamber and a contiguous cooling portion including the other end of the chamber, an inlet at the combustion end for receiving fuel and air to be burned and an outlet at the cooling end thereof, said chamber comprising inner and outer walls defining a water jacket therebetween along the entire length and periphery of the chamber for receiving cooling water at the combustion end, and a plurality of spray nozzles disposed along the length of the cooling portion and around the periphery thereof, said spray nozzles receptive of water from the water jacket for spraying into the cooling portion of the chamber.

2. The apparatus according to claim 1, further comprising a scrubber positioned downstream of the combustion chamber and including a preceding cooler for the cooling of scrubbing water received by the scrubber, and an adsorption drier following the scrubber.

3. The apparatus according to claim 2, further comprising means for circulating the cooling water for said scrubber within a closed loop or circuit.

4. The apparatus according to claim 3, further comprising a metering device for supplying additives into the cooling water circuit.

5. The apparatus according to claim 4, further comprising a pair of parallel connected adsorption driers, one for the drying of the inert gas and the other for regeneration by a partial gas stream branched off from the dried inert gas stream and means for alternatingly connecting the driers.

6. The apparatus according to claim 5, wherein the regenerated adsorber includes means for cooling same down to the operational temperature after the regeneration thereof.

7. The apparatus according to claim 6, further comprising a connecting line including a blower between said adsorption driers and said combustion chamber, said connecting line opening into said combustion chamber for re-feeding the inert gas used for the regeneration, upstream of the region of the spray cooling nozzles.

8. The apparatus according to claim 1, wherein the spray nozzles have spray heads which are accessible from the outside of the combustion chamber.

* * * * *